(12) United States Patent
Kotaru et al.

(10) Patent No.: US 11,665,589 B2
(45) Date of Patent: May 30, 2023

(54) COMPUTE-AWARE RESOURCE CONFIGURATIONS FOR A RADIO ACCESS NETWORK

(71) Applicant: Microsoft Technology Licensing, LLC, Redmond, WA (US)

(72) Inventors: Manikanta Kotaru, Kenmore, WA (US); Arjun Varman Balasingam, San Jose, CA (US); Paramvir Bahl, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/334,577

(22) Filed: May 28, 2021

(65) Prior Publication Data

US 2022/0386171 A1 Dec. 1, 2022

(51) Int. Cl.
*H04W 28/06* (2009.01)
*H04W 28/08* (2023.01)

(52) U.S. Cl.
CPC ....... *H04W 28/06* (2013.01); *H04W 28/0942* (2020.05)

(58) Field of Classification Search
CPC ....... H04L 43/08; H04L 41/16; H04L 41/145; H04L 41/5051; H04L 41/5054; H04L 47/2425; G06N 20/00; G06F 11/3409; G06F 30/27; H04W 24/02; H04W 28/06; H04W 28/0942; H04W 28/16; H04W 28/24; H04W 72/04; H04W 74/0833
See application file for complete search history.

(56) References Cited

U.S. PATENT DOCUMENTS

| | | | | |
|---|---|---|---|---|
| 2021/0235323 A1* | 7/2021 | Parekh | ................... | H04W 28/16 |
| 2021/0235473 A1* | 7/2021 | Parekh | ................... | H04W 72/04 |
| 2022/0046652 A1* | 2/2022 | Yang | ..................... | H04W 28/10 |
| 2022/0171664 A1* | 6/2022 | Guzik | ................... | G06F 9/5077 |

OTHER PUBLICATIONS

Albonda, et al., "An Efficient RAN Slicing Strategy for a Heterogeneous Network With eMBB and V2X Services", In Journal of IEEE Access, vol. 7, Mar. 29, 2019, pp. 44771-44782.
Othman, et al., "Efficient admission control and resource allocation mechanisms for public safety communications over 5G network slice", In Journal of Telecommunication Systems, vol. 72, Issue 4, Jul. 27, 2019, pp. 595-607.
"International Search Report and Written Opinion Issued in PCT Application No. PCT/US22/027738", dated Aug. 26, 2022, 14 Pages.

* cited by examiner

Primary Examiner — Kan Yuen

(57) ABSTRACT

Aspects of the present disclosure relate to allocating RAN resources among RAN slices using a machine learning model. In examples, the machine learning model may determine an optimal RAN resource configuration based on compute power needs. As a result, RAN resource allocation generation and compute power requirements may improve, even in instances with changing or unknown network conditions. In examples, a prediction engine may receive communication parameters and/or requirements associated with service-level agreements (SLAs) for applications executing at least partially at a device in communication with the RAN. The RAN may generate one or more RAN resource configuration for implementation among RAN slices. Upon a change in network conditions or SLA requirements, an optimal RAN configuration may be determined in terms of required compute power.

20 Claims, 10 Drawing Sheets

COMPUTE-AWARE RESOURCE CONFIGURATIONS FOR A RADIO ACCESS NETWORK

BACKGROUND

Demand for integration between a cloud network and a radio access network (RAN) and/or a core network for wireless telecommunications has rapidly increased. The RAN provides wireless connectivity to mobile computing devices by converting radio frequency signals into data bits and vice versa. The core network coordinates among various parts of the RAN and provides connectivity to a packet-based network (e.g., the Internet). Traditional wireless telecommunications deployed servers with hardware that was specialized to particular types of processing and was typically built with a capacity to accommodate an estimated peak load of the network traffic. Use of cloud network technology, particularly virtual server technologies, has enabled decoupling of at least some wireless data processing from specialized hardware onto general-purpose servers. The general-purpose servers, combined with accelerators and the virtualization technologies, are able to dynamically change resource usage based on non-real-time and near real-time network demands.

With the advent of 5G, which is a system of mobile communications that improved upon aspects of the previous 4G system (reduced latency, increased bandwidth, etc.), the scope of mobile networks has increased to provide a broad range of wireless services delivered across multiple platforms and multi-layer networks. 5G specifications outline a host of performance requirements related to bandwidth, peak data rate, energy efficiency, reliability, latency (both user-plane and control-plane latency), traffic capacity, etc. To meet these requirements, the RAN architecture has expanded. For instance, Multi-Access Edge Computing (MEC) brings applications from centralized datacenters to the network edge, closer to end users. MEC provides low latency, high bandwidth, and real-time access to RAN information. Distributing computing power enables the high volume of 5G devices and facilitates disaggregated, virtual RANs to create additional access points. Network Function Virtualization (NFV) replaces network functions like firewalls, load balancers, and routers with virtualized instances that run as software. Enhanced Common Public Radio Interface (eCPRI) can be used, for instance, for the fronthaul interface of a cloud RAN (e.g., for the real-time processing by the distributed unit (DU)).

A wireless telecommunication network is based on physical and geographical constraints. For example, cell towers, which provide cellular wireless coverage areas for mobile devices (e.g., smartphones), need to be physically distributed. Switches and servers, which process radio signals from cell towers into electrical or optical signals, need to be physically co-located or within a geographic range of each cell tower. The switches and the RAN servers need to process and route the cellular data traffic in real-time. Further, a RAN may comprise multiple "slices," where each slice has associated service-level guarantees and components of the RAN are configured to process traffic for such slices accordingly. For example, a first slice may be a low-latency communication network (e.g., for substantially real-time processing), while a second slice may be a high-throughput communication network (e.g., for mobile broadband). Accordingly, traffic and associated processing for each slice may be handled by the RAN so as to maintain such service-level guarantees, for example on a statistical basis.

However, allocating resources of the RAN to maintain the service-level guarantees of each associated slice may be difficult. As virtualization technologies are increasingly used for RAN workloads, scaling and optimizing compute while delivering SLA requirements is crucial for cloud service providers and application developers.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

According to the present disclosure, the above and other issues are resolved by allocating RAN resources among RAN slices according to optimal compute power. For example, a network slice controller (NSC) may generate a RAN resource allocation or configuration. The generated RAN resource configuration may be implemented by the RAN so as to allocate RAN resources among slices of the RAN accordingly.

In examples, communication parameters and/or requirements associated with service-level agreements (SLAs) for applications executing at least partially at a device in communication with the RAN may be provided to a machine learning model, where the machine learning model may determine one or more RAN resource configurations. In examples, the machine learning model may determine an optimal RAN resource configuration based on compute power needs. As a result, RAN resource allocation generation and compute power requirements may improve, even in instances with changing or unknown network conditions.

In accordance with examples of the present disclosure, a system is described. The system may include at least one processor; and memory storing instructions that, when executed by the at least one processor, causes the system to perform a set of operations, the set of operations comprising: receiving communication requirements from a plurality of service level agreements (SLAs); retrieving a model that predicts an amount of compute resources needed to implement resource allocation configurations of a radio access network (RAN), the model being trained on training data mapping changes in RAN resource configurations to compute resources needed at one or more stages in a physical layer software processing pipeline; generating, using the retrieved model, a resource allocation configuration for a set of resources of the RAN based on the received communication requirements; and implementing the resource allocation by forming a first RAN slice comprising a first set of logical resources and a second RAN slice comprising a second set of logical resources.

In accordance with examples of the present disclosure, a method for allocating resources of a radio access network (RAN) is described. The method may include receiving communication requirements from a plurality of service level agreements (SLAs); retrieving a model that predicts an amount of compute resources needed to implement resource allocation configurations of a radio access network (RAN), the model being trained on training data mapping changes in RAN resource configurations to compute resources needed at one or more stages in a physical layer software processing pipeline; generating, using the retrieved model, a resource allocation configuration for a set of resources of the RAN based on the received communication requirements; and implementing the resource allocation by forming a first RAN slice comprising a first set of logical resources and a second RAN slice comprising a second set of logical resources.

In accordance with examples of the present disclosure, a method for allocating resources of a radio access network (RAN) to form a first RAN slice and a second RAN slice is described. The method may include: receiving communication requirements from a plurality of service level agreements (SLAs); retrieving a model that predicts an amount of compute resources needed to implement resource allocation configurations of a radio access network (RAN), the model being based on data mapping changes in RAN resource configurations to compute resources needed at one or more stages in a physical layer software processing pipeline; receiving channel state information associated with a device in communication with the RAN; generating, using the retrieved model, a resource allocation configuration for a set of resources of the RAN based on the received communication requirements and the channel state information; and implementing the resource allocation, thereby forming the first RAN slice comprising a first set of logical resources and the second RAN slice comprising a second set of logical resources.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

DETAILED DESCRIPTION

Figure 1:
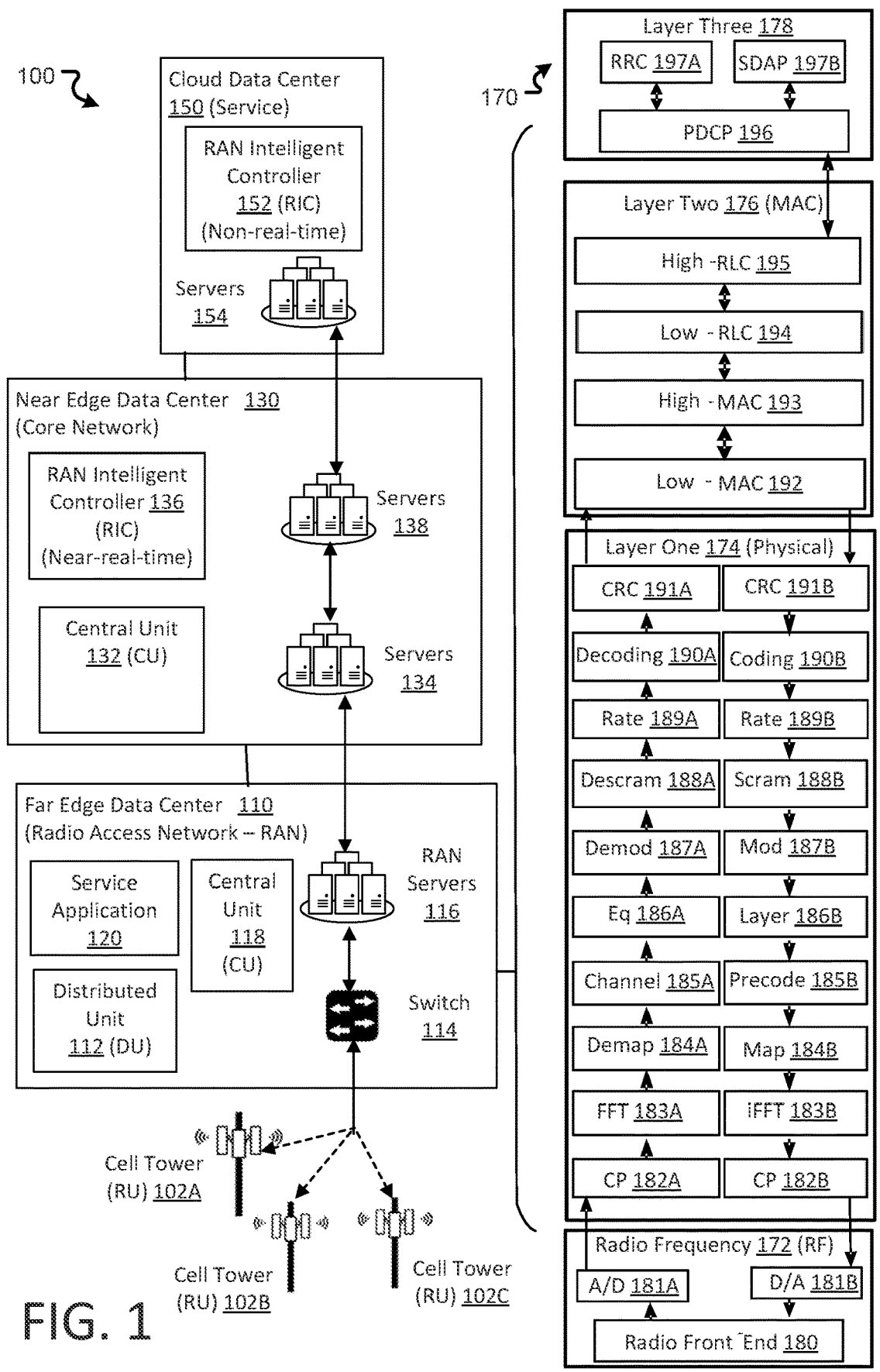
FIG. 1 illustrates an overview of an example system for allocating RAN resources in accordance to aspects of the present disclosure.

Various aspects of the disclosure are described more fully below with reference to the accompanying drawings, which form a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Practicing aspects may be as methods, systems, or devices. Accordingly, aspects may take the form of a hardware implementation, an entirely software implementation or an implementation combining software and hardware aspects. The following detailed description is, therefore, not to be taken in a limiting sense.

A mobile wireless telecommunication network may use a cloud service for implementing a RAN. In this case, the cloud service connects cell towers, with which mobile devices (e.g., smartphones) connect, to the public network (e.g., the Internet) and/or private networks. The cloud service provides virtual servers and other computing resources for dynamically scaling the computing capacity as needed based on the volume of data traffic. In aspects, a cloud RAN infrastructure represents an implementation of cloud services for the RAN. In contrast to a typical cloud service, the cloud RAN infrastructure includes geographical and physical constraints as well as latency constraints imposed by RAN standards. The cloud RAN includes connection to at least one cell tower associated with a Radio Unit (RU) and cloud servers associated with one or more of a Distributed Unit (DU), a Central Unit (CU), and a RAN Intelligent Controller (RIC). The cell tower is in the field, where mobile devices connect over wireless cellular communications, and the RU of the cell tower connects to a DU of a RAN server at a far-edge data center. To enable real-time processing of RAN data traffic, the far-edge data center is relatively close (e.g., a few kilometers) to the cell tower. The DU is associated with switches and one or more RAN servers. The switches and the RAN server(s) associated with the DU process data in a series of operations or partitions associated with at least layer one (i.e., the physical layer) of the Open Systems Interconnection (OSI) model.

In examples, a RAN comprises multiple slices that are each used by a respective set of devices. The RAN components described herein may be allocated among the slices, thereby forming one or more logical networks using the physical resources of the RAN. A network slice controller (NSC) may be used to manage resource allocation. Example RAN resources include, but are not limited to, resource blocks, time slots, numerology, and/or a number of multiple-input and multiple-output (MIMO) layers for each slice of the RAN. For example, RAN resources may be allocated according to service-level guarantees associated with the slices, such that each slice exhibits a requested set of characteristics (e.g., latency, a bit/packet error rate, associated energy consumption, or throughput). In some instances, resources may be allocated to meet service-level guarantees on a statistical basis, where one or more characteristics of a slice may vary over time and exhibit a specified variance and/or specified average for a predetermined period of time according to an associated service-level guarantee.

In some examples, a RAN resource configuration that is implemented may not be optimal in terms of compute power used. While a plurality of RAN resource configurations may be capable of satisfying the same set of service-level agreement, examples provided herein identify a RAN resource configuration optimized for compute power.

As discussed in more detail below, the present disclosure relates to determining an optimal RAN resource configuration, where the optimal RAN resource configuration may take into account various SLA requirements while providing a RAN resource configuration that uses an optimal amount of compute power. In examples, multiple RAN resource configurations may support multiple SLA requests from client devices; however, a selected RAN resource configuration that minimizes the amount of computational power required may be implemented. Such an optimal RAN resource configuration may be obtained by providing requirements, such as requirements derived from or based on SLA requirements associated with devices and/or applications implemented by such devices, to a RAN configuration model. The RAN configuration model may be a heuristics based model. Alternatively, or in addition, the RAN configuration model may be a machine learning model trained using training data that includes requirements information (e.g., SLA requirements) and an associated required compute power. In examples, one or more RAN resource configurations may be provided by the RAN configuration model, where the model requiring the least or minimum amount of compute power may be selected and then implemented for the RAN, such that RAN resource allocation is responsive to changing network conditions.

FIG. 1 illustrates an overview of an example system 100 in which a configuration for allocating RAN resources may be used in accordance with the aspects of the present disclosure. Cell towers 102A-C transmit and receive wireless communications with mobile computing devices 104A-B (e.g., smartphones) over a radio access network (RAN). The example system 100 further includes far-edge data center 110 (switches, RAN servers), near-edge data center 130 (core network servers), and cloud data center 150 (cloud services). In aspects, the example system 100 corresponds to a cloud RAN infrastructure for a mobile wireless telecommunication network.

The far-edge data center 110 is a data center that is part of the cloud RAN, which includes distributed unit 112 (DU), central unit 118 (CU), and service application 120. In aspects, the far-edge data center 110 enables cloud integration with a radio access network (RAN). The far-edge data center 110 includes a switch 114 and RAN servers 116. The switch 114 and the RAN servers 116 process incoming data traffic and outgoing data traffic associated with layer one (the physical layer) and at least a part of layer two (MAC) of the OSI model. In aspects, the far-edge data center 110 is generally geographically remote from the cloud data centers associated with the core network and cloud services. The remote site is in proximity to the cell towers. For example, the proximity in the present disclosure may be within a few kilometers or more. In aspects, the upstream data traffic corresponds to data flowing from the cell towers 102A-C to servers 154 in the cloud data center 150 (service) Similarly, the downstream data traffic corresponds to data flowing from the cloud data center 150 (service) to the cell towers.

The near-edge data center 130 (e.g., hosting the core network) includes a central unit 132 (CU) and RAN intelligent controller 136 (RIC) (near real-time processing, which may be less strictly time-sensitive than real-time processing). As illustrated, CU 132 is associated with servers 134 and RIC 136 is associated with servers 138. In aspects, the near-edge data center 130 is at a regional site of a private cloud service. For example, the regional site may be about tens of kilometers from the cell towers.

The cloud data center 150 (service) includes RIC 152 (non-real-time processing) associated with servers 154. For example, RIC 152 processes non-real-time service operations. In aspects, the cloud data center 150 may be at a central location in a cloud RAN infrastructure. For example, the central locations may be hundreds of kilometers from the cell towers.

In aspects, the far-edge data center 110, which is closer to the cell towers 102A-C than the cloud data center 150, provides real-time processing. In contrast, the cloud data center 150, which is the furthest from the cell towers 102A-C in the cloud RAN infrastructure, provides processing in a non-real-time manner.

As described above, the RAN resources depicted by system 100 may be allocated to form multiple slices through which data from mobile devices are communicated. For example, RIC 152 may comprise an NSC that allocates RAN resources to form logical slices according to a set of service-level agreements (SLAs). As an example, RIC 152 may configure aspects of cell towers 102A-C, far-edge data center 110, and/or near-edge data center 130. In examples, RIC 136 may include the NSC rather than RIC 152, as the additional latency (e.g., between cloud data center 150 and other RAN resources) compared to that of near-edge data center 130 may introduce additional complexity and/or result in reduced performance. For example, an NSC at cloud data center 150 may generate RAN resource allocations further into the future (e.g., based on forecasted performance information further into the future) to account for the additional latency, which may result in reduced accuracy for expected slice characteristics and associated generated reward information.

An NSC (e.g., of RIC 136) may generate RAN resource configurations on a per-frame basis (e.g., every 10 milliseconds and/or at the same interval as performance information is generated), such that RAN resources and configurations may be reconfigured as specified by the NSC after each frame according to an optimal configuration as determined by a prediction engine as described herein. In other examples, RAN resource configurations may be changed at a different frequency and/or may be generated in response to the occurrence of one or more events (e.g., based on determining a slice characteristic has exceeded a service-level agreement or based on determining a number of devices of a slice has exceeded a predetermined threshold). In examples, additional resources may be added to or subtracted from an amount of available RAN resources based on the changes in service-level agreements encountered. For example, as additional devices utilize the RAN, the RAN configuration may change and/or may include additional resources previously not used by the RAN.

The operational partitions 170 illustrate partitions processing data traffic in the RAN. For example, the partitions may correspond to operations associated with the OSI seven-layer model. In particular, a set of partitions associated with layer one 174 (the physical layer) is the lowest layer.

In aspects, prior to processing data at layer one 174 involves conversion of data associated with a radio frequency 172 (RF). For radio frequency 172 (RF) data processing, the radio front-end partition receives and sends data through the cell towers 102A-C to mobile computing devices over wireless communications. The A/D 181A converts analog data from the radio front-end to digital data for the upstream data traffic. The D/A 181B converts digital data into analog data for the downstream data traffic.

Partitions in layer one 174 (physical layer) may be associated with operations for converting coded symbols associated with a bit stream into a physical signal for transmission using communication media (e.g., a physical wire or radio). In aspects, the operational partitions of the physical layer may include, for processing upstream data traffic, CP 182A, FFT 183A, Demap 184A, Channel 185A, Eq 186A, Demod 187A, Descram 188A, Rate 189A, Decoding 190A, and CRC 191A. The physical layer may further include, for processing downstream data traffic, CRC 191B, Coding 190A, Rate 189B, Scram 188B, Mod 187B, Layer 186B, Precode 185B, Map 184B, iFFT 183B, and CP 182B.

Partitions in layer two 176 (medium access control—MAC) may be associated with operations for transferring data frames between network hosts over a physical link. In aspects, partitions in layer two correspond to the network layer in the OSI seven-layer model. Low-MAC 192 is the lowest partition in the layer two 176. Other partitions above the Low-MAC 192 include, an ascending sequence of layers, High-MAC 193, Low-Radio Link Control (RLC) 194, and High-RLC 195.

Partitions in the layer three 178 may be associated with operations for forwarding data packets through routers. In aspects, layer three 178 corresponds to the network layer in the OSI seven-layer model. The partitions in layer three 178 may be associated with protocol-governed operations such as Packet Data Convergence Protocol 196 (PDCP), Radio Resource Control 197A (RRC) and Service Data Adaptation Protocol 197B (SDAP).

In aspects, a combination of DU 112 and CU 118 in the far-edge data center 110 may process partitions associated with layer one 174, layer two 176, and at least a part of layer three 178. In particular, respective servers of RAN servers 116 include CPUs and a variety of accelerators for processing data associated with one or more partitions of the operational partitions 170. Use of an accelerator for processing a partition reduces a workload on the CPU. In aspects, the accelerators are heterogeneous. Some accelerators include pre-programmed logic for performing specific operational partitions. Some other accelerators are programmable. Some accelerators provide fast table lookups, while some other accelerators provide fast bit operations (e.g., graphics and video data).

As described above, the RAN resources depicted by system 100 may be allocated to form multiple slices through which data from mobile devices are communicated. For example, RIC 152 may comprise an NSC that allocates RAN resources to form logical slices according to a set of service-level guarantees. As an example, RIC 152 may configure aspects of cell towers 102A-C, far-edge data center 110, and/or near-edge data center 130. In examples, RIC 136 may include the NSC rather than RIC 152, as the additional latency (e.g., between cloud data center 150 and other RAN resources) compared to that of near-edge data center 130 may introduce additional complexity and/or result in reduced performance. For example, an NSC at cloud data center 150 may generate RAN resource allocations further into the future (e.g., based on forecasted performance information further into the future) to account for the additional latency, which may result in reduced accuracy for expected slice characteristics and associated generated reward information.

As will be appreciated, the various methods, devices, applications, features, etc., described with respect to FIG. 1 are not intended to limit the system 100 to being performed by the particular applications and features described. Accordingly, additional controller configurations may be used to practice the methods and systems herein and/or features and applications described may be excluded without departing from the methods and systems disclosed herein.

Figure 2:
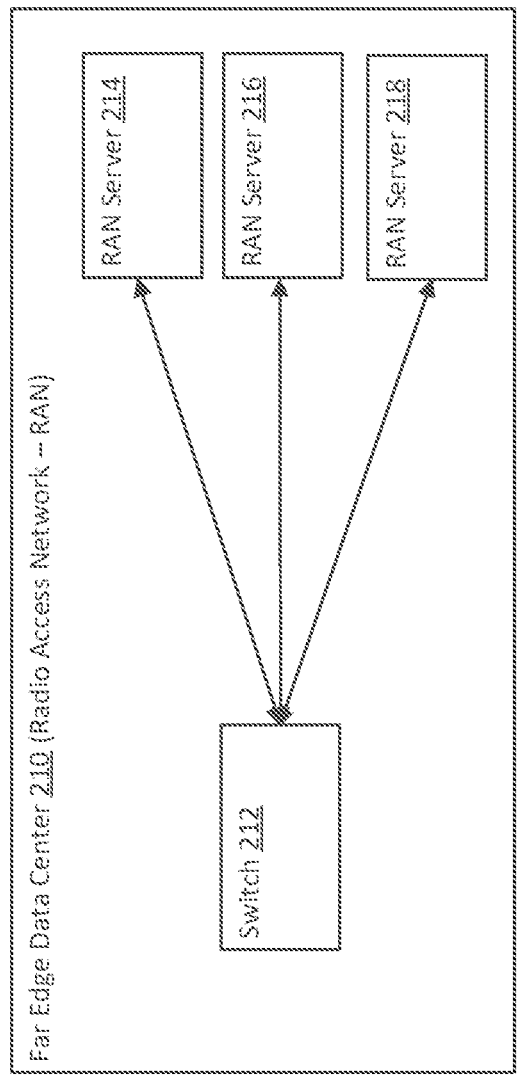
FIG. 2 illustrates examples of a far-edge data center of a RAN in accordance with aspects of the present disclosure.

FIG. 2 illustrates an example of a far-edge data center 210. The far-edge data center 210 at least includes a switch 212 and RAN servers 214-216. The switch 212 connects the cell towers (e.g., the cell towers 102A-C as shown in FIG. 1) with one or more of the RAN servers 214-216 of the far-edge data center 210. In aspects, the switch 212 is a programmable switch, which loads a program that instructs switching data traffic to a particular RAN server. Additionally or alternatively, the program may monitor data traffic at the switch 212.

The respective RAN servers 214-218 include CPUs and heterogeneous accelerators. For example, the heterogeneous accelerators may include one or more of ASIC-based programmable switches, ASIC-based network interface controllers (NICs), neural processing unit (NPU)-based NICs, field-programmable gate array (FPGA)-based NICs, and the like. Other types of heterogeneous accelerators include graphical processing unit (GPU) and FPGA-based graphics accelerators.

In examples, switch 212 and servers 214-218 are RAN resources that may be allocated (e.g., by an NSC) for various slices of the RAN according to aspects described herein. For example, RAN servers 214, 216, and/or 218 may each process workloads of various slices of the RAN, according to service-level guarantees associated with the slice. As an example, a low-latency slice (e.g., for real-time Internet-of-things (IoT) processing) may be assigned more resources and/or resources at a higher priority as compared to a throughput slice (e.g., for mobile broadband) where latency is a comparatively lower priority.

Figure 3:
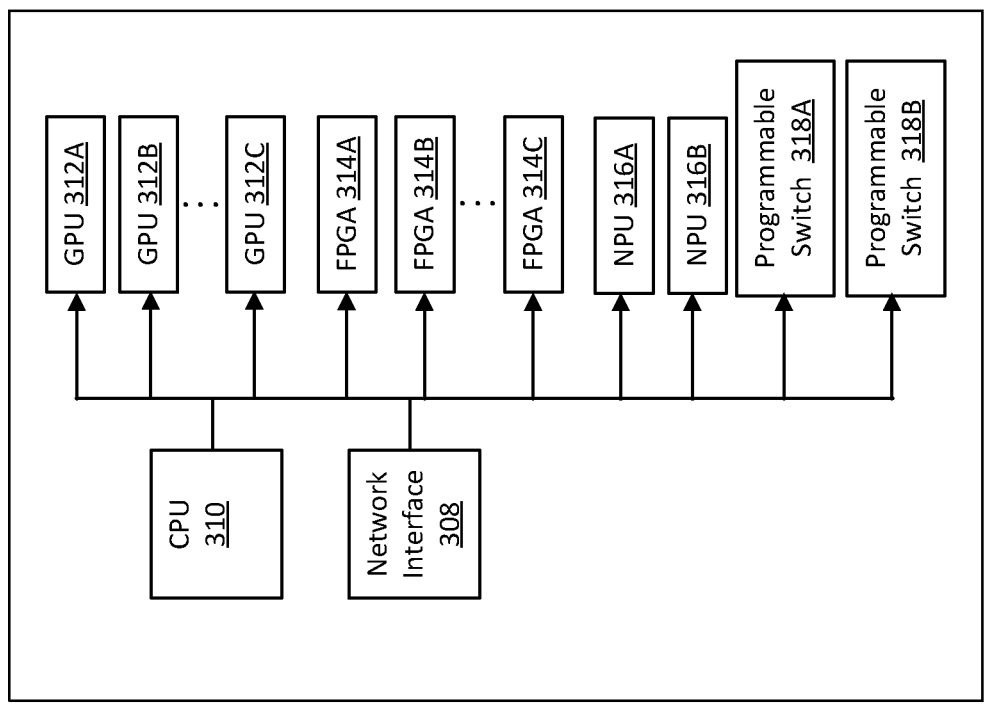
FIG. 3 illustrates examples of a RAN server in accordance with aspects of the present disclosure.

FIG. 3 illustrates examples of a RAN server in accordance with the aspects of the present disclosure. As illustrated, the RAN server 300 includes a CPU 310, a set of GPUs 312A-C, FPGAs 314A-C, NPUs 316A-B, programmable switches 318A-B, and a network interface 308. Some accelerators in the set of heterogeneous accelerators may be pre-programmed for performing a specific task. For example, the FPGA 314A may be pre-programmed with code for decoding/coding of data (e.g., Decoding 190A and Coding 190B as shown in FIG. 1) in layer one. Some other accelerators may be programmable by loading a code that performs operations associated with a partition or a service application. The network interface 308 interfaces the CPU 310, the heterogeneous accelerators, the cell towers, and the near-edge data center (core network) for connecting with the cloud infrastructure and other RAN servers and switches.

In aspects, the CPU 310 monitors a workload level of the CPU 310 and respective accelerators. The CPU 310, based on the workload level, may offload a task being processed by the CPU 310 to one or more of the accelerators with available processing resources. In aspects, the CPU 310 allocates a cluster of accelerators for processing a task. In examples, resources of RAN server 300 (e.g., CPU 310, a set of GPUs 312A-C, FPGAs 314A-C, NPUs 316A-B, programmable switches 318A-B, and a network interface 308) are configured by an NSC to allocate such resources among a set of slices of a RAN according to aspects of the present disclosure.

Figure 4:
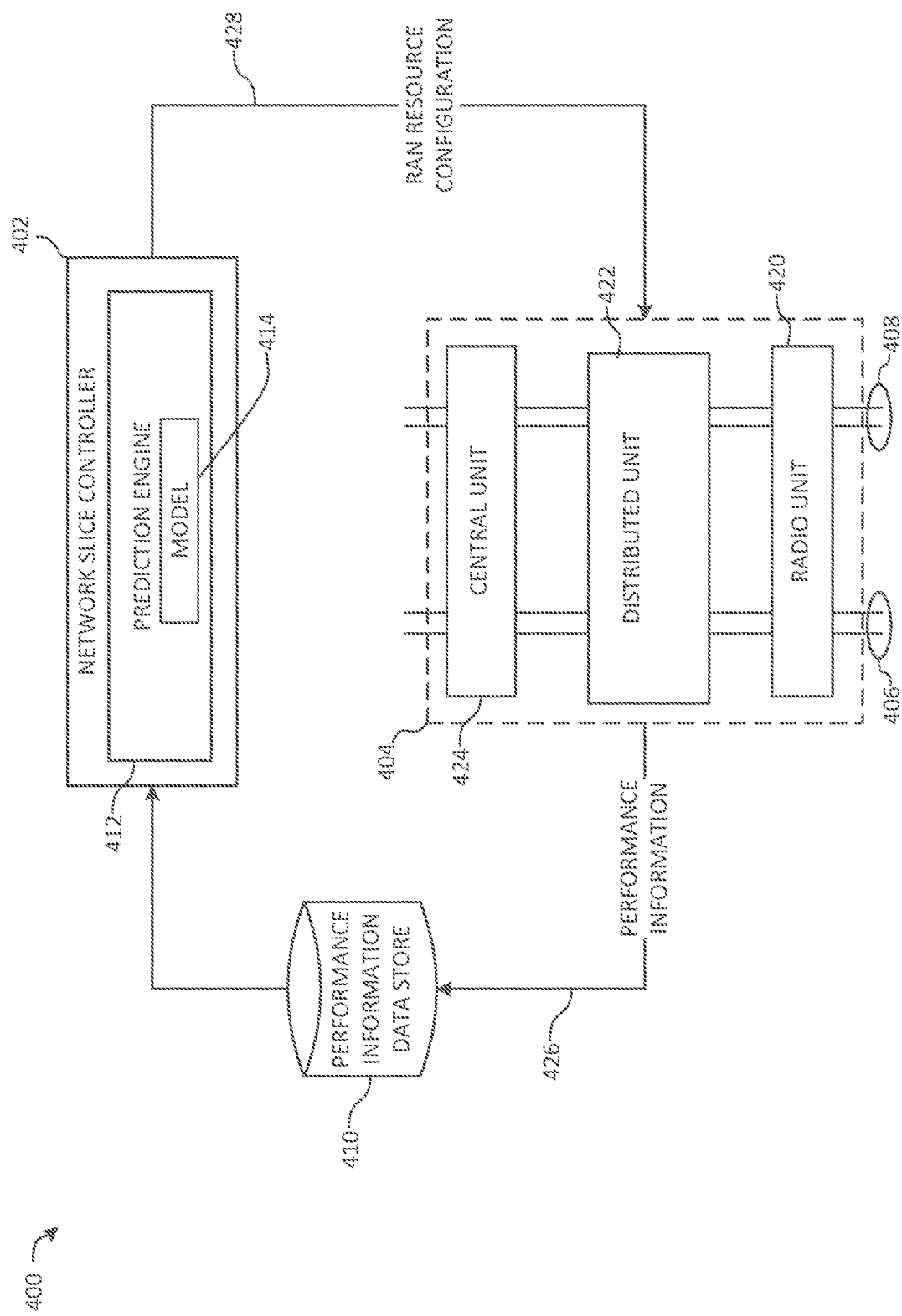
FIG. 4 illustrates a system depicting aspects of resource scheduling for a RAN.

FIG. 4 illustrates a system 400 depicting aspects of network scheduling for a RAN. As illustrated, system 400 comprises network slice controller (NSC) 402 and RAN components 404. As discussed above, network slice controller 402 may be implemented as part of a RAN intelligent controller (RIC), such as RIC 136 or RIC 152 discussed above with respect to system 100 in FIG. 1.

RAN components 404 are illustrated as comprising distributed unit 422, central unit 424, and the radio unit 420. It will be appreciated that such components are provided as example RAN components and that any of a variety of additional or alternative RAN components may be used in other examples. Further, such aspects may be similar to those discussed above with respect to FIGS. 1-3 and are therefore not necessarily re-described below in detail. For example, RAN components 404 may have associated physical resources that are allocated according to aspects described herein, such as resource blocks, time slots, numerology, and/or a number of MIMO layers.

NSC 402 configures RAN components 404 to allocate associated RAN resources, thereby forming one or more logical slices using RAN components 404. As illustrated, slice 406 and slice 408 are logically implemented using the RAN components 404. For example, slice 406 may comprise resources of distributed unit 422, central unit 424, and radio unit 420 to facilitate network communications with a set of associated devices (not pictured). Similarly, slice 408 may comprise resources of distributed unit 422, central unit 424, and radio unit 420 to facilitate network communications with another set of associated devices (not pictured). It will be appreciated that each set of respective devices need not be mutually exclusive. Further, in some examples, slices 406 and 408 may be isolated from one another, such that devices associated with one slice are isolated from devices associated with another slice. The NSC 402 may configure RAN components 404 (e.g., associated with physical RAN resources) to form slices 406 and 408 each have a resulting set of logical resources allocated among devices of each slices 406 and 408.

The system 400 is further illustrated as comprising performance information data store 410, which may store performance information associated with slices 406 and 408. In examples, performance information data store 410 may form part of a RIC, such as RIC 136 or RIC 152 discussed above with respect to system 100 in FIG. 1. Example performance information includes, but is not limited to, (a) wireless channel information like channel state information and received signal strength information; (b) data traffic, such as an amount of data the application requests to be served; and (c) observed SLAs such as throughput, bit/packet error rate, number of scheduled transmissions for energy consumption data estimation and latency information.

In some instances, NSC 402 may be able to determine and/or configure at least a part of the resource allocation behavior of local scheduler 416 and/or local scheduler 418, such that a RAN resource allocation generated by NSC 402 may specify or otherwise account for the behavior of the local schedulers. The NSC 402 applies aspects of machine learning to generate RAN resource configurations as described herein. As illustrated, NSC 402 comprises a prediction engine 412 which may include a model 414. The model 414 may be a machine learning model trained on data reflecting compute power and SLA parameters and/or requirements. In examples, prediction engine 412 processes receives SLA parameters and/or characteristics together with CSI information to generate RAN resource configurations. Thus, NSC 402 may generate a RAN resource configuration to meet a set of service-level agreements for slices 406 and 408. The RAN resource configuration may be optimized in terms of compute power; the RAN resource configuration determination by NSC 402 is used to configure RAN components 404, as illustrated by arrow 428. Accordingly, one or more CPUs may be reliably provisioned to meet frame processing targets while minimizing a required compute power.

It will be appreciated that while system 400 is illustrated as comprising two local schedulers 416 and 418, any number of local schedulers may be used. Similarly, it will be appreciated that similar techniques may be used to address potentially unknown behaviors of any of a variety of other components of a RAN.

Figure 5:
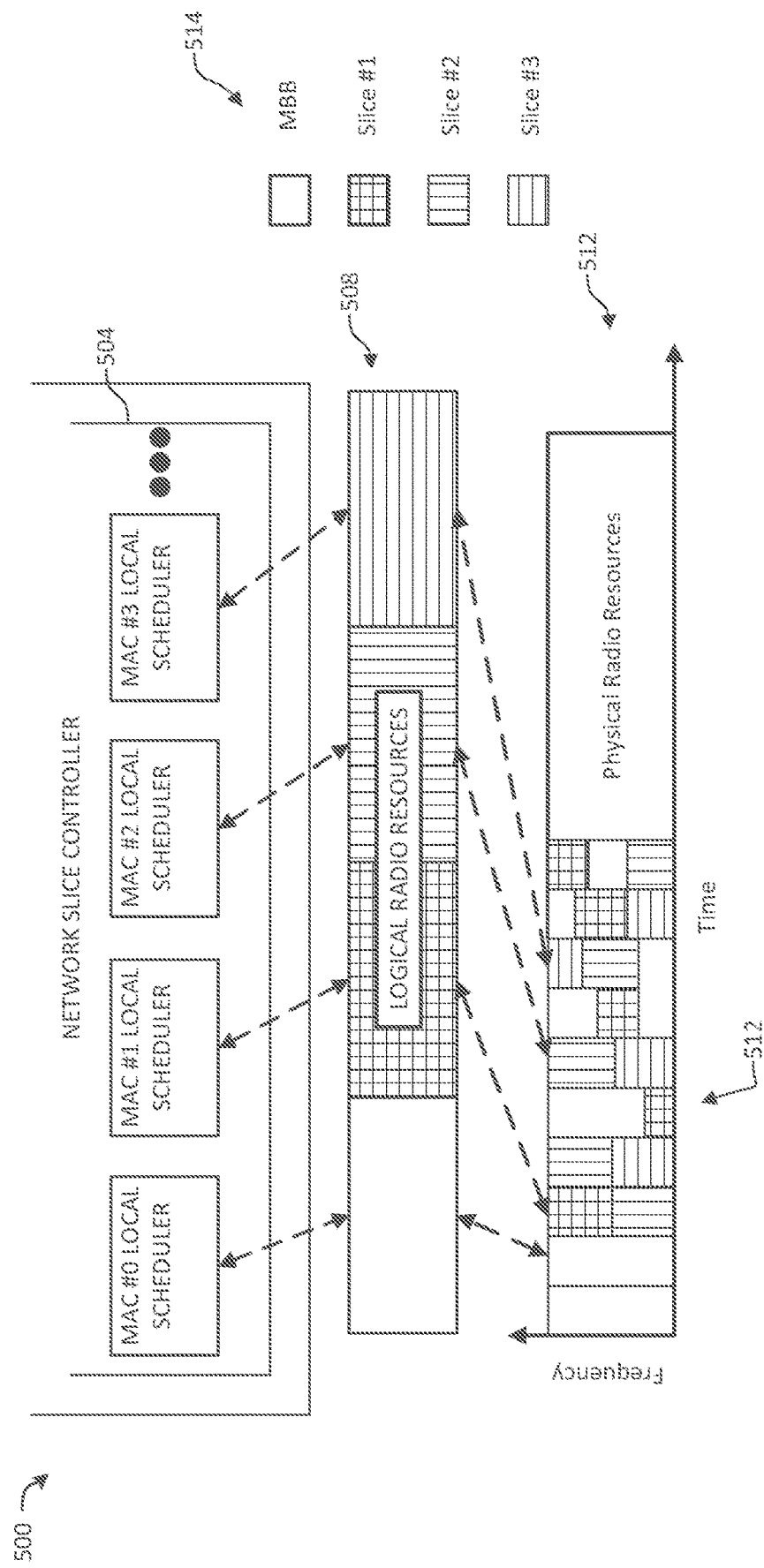
FIG. 5 illustrates an example of network slicing and logical to physical resource mapping for a RAN.

FIG. 5 depicts additional details directed to resource scheduling in accordance with example of the present disclosure. In examples, the a network slice controller 504 may utilize a plurality of MAC schedulers to interface with logical radio resources 508 in an intelligent manner. That is, the network slice controller 504 may slice the physical radio resources 512 into various slices 518 accessible via the one or more MAC schedulers. The network slice controller 504 may map the logical radio resources 508 to the physical radio resource 512 as depicted in the example of FIG. 5. The physical radio resources 512 may include but are not limited to time resources, frequency resources, and/or MIMO resources. A plurality of configurations that include time resources, frequency resources, and MIMO resources may meet service-level agreement requirements; however, a configuration may be selected based on the amount of compute power determined or predicted to be used by the configuration. Thu, the compute resources of the RAN may be dynamically provisioned to run the RAN workloads in order to minimize the amount of compute resources while still meeting application service-level agreements associated with device.

In examples, the service-level agreements may be implemented or otherwise requested by an application at least partially executed at a device, where such application may request that the RAN provision communication or connectivity resources in accordance with a service-level agreement. In examples, the service-level agreement may indicate an one or more of an amount of throughput (e.g., broadband) needed, a desired or maximum latency, a bit or packet error rate, and/or an amount of energy consumed. Accordingly, the network slice controller 504 may determine one or more configuration of physical radio resources 512 that effectively handle or otherwise meet one or more SLAs.

Figure 6:
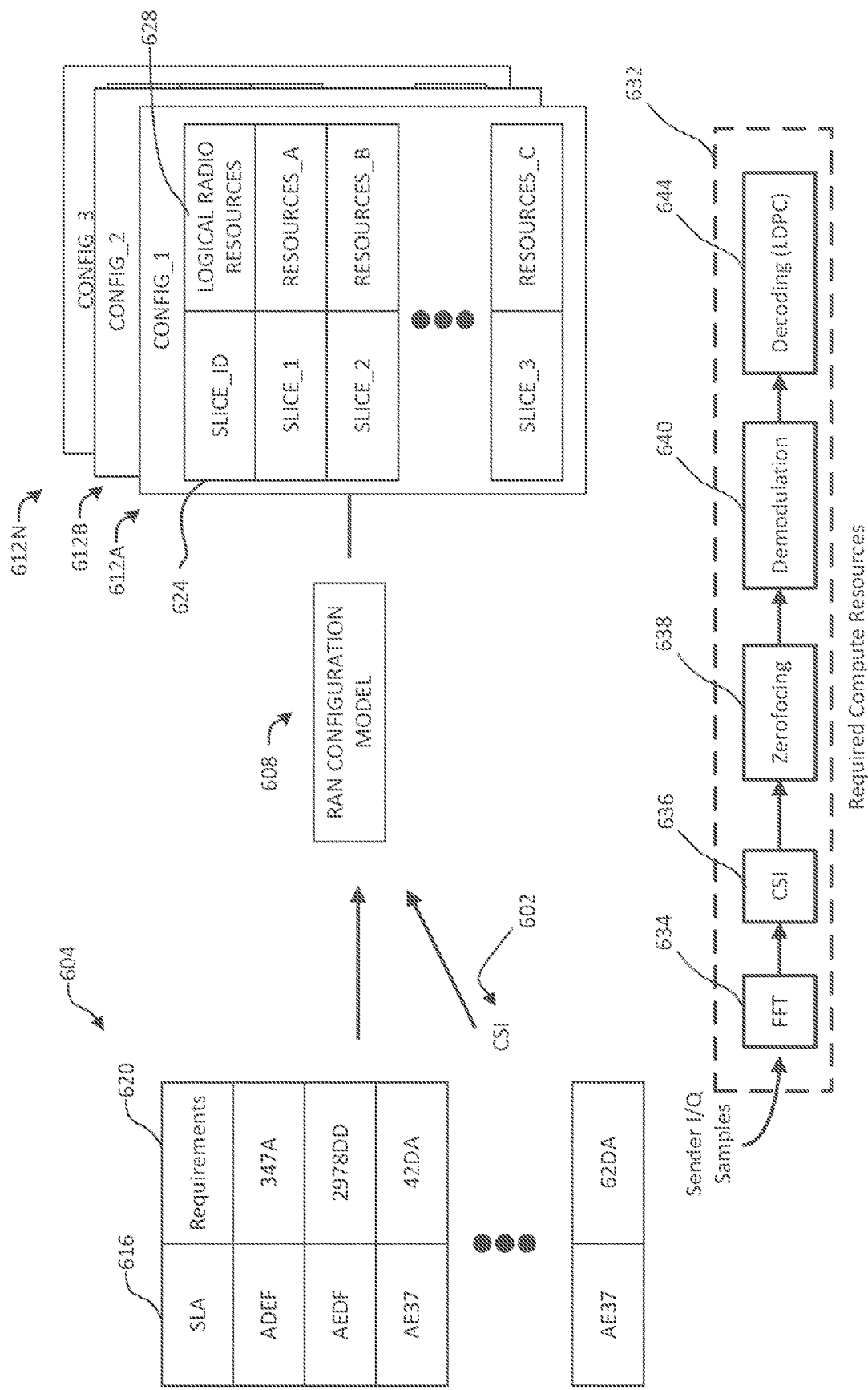
FIG. 6 illustrates an example of a RAN configuration model and one or more RAN resource configurations for implementation at a RAN.

FIG. 6 illustrates details associated with generating one or more RAN configurations in accordance with examples of the present disclosure. More specifically, CSI information 602 and one or more SLAs may be received at a RAN and may include an SLA identifier 616 together with one or more communication parameters or requirements 620. The one or more communication parameters or requirements 620 may identify a location of such parameters or otherwise may include such parameters directly. The SLAs to be handled by a RAN may be provided to the RAN configuration model 608. Alternatively, or in addition, the parameters or requirements from the SLAs 616 may be provided to the RAN configuration model 608. The parameters or requirements provided to the RAN configuration model 608 may represent a sum total or cumulative total of requested resources. For example, the throughput requested by each SLA may be summed and provided to the RAN configuration model 608. The RAN configuration model may generate one or more RAN resource configurations 612A-N based on the CSI information 602 and the parameters or requirements provided to the RAN configuration model 608.

In some examples, the RAN configuration model 608 may heuristically determine RAN resource configurations 612A-N based on the CSI information 602 and the parameters or requirements provided to the RAN configuration model 608. In other examples, the RAN configuration model 608 may provide the CSI information 602 and the parameters or requirements to a machine learning model such that the machine learning model trained on data including parameters and requirements together with respective RAN resource configurations 612A-N and compute usage may generate or otherwise output a RAN resource configuration 612A. In examples, the RAN resource configuration 612A output from the machine learning model may be an optimal resource configuration when optimized for compute power usage. That is, multiple RAN resource configurations 612A-N may satisfy the SLA parameters or requirements 604; however, the RAN configuration model 608 may output or otherwise determine an optimal RAN resource configuration 612A based on an amount of compute power required or otherwise predicted to be used with the CSI information 602 and a selected RAN resource configuration 612A. In some examples, the SLA parameters and/or requirements 604 may not change from one frame to another; however, the CSI information 602 or other network condition may change. Accordingly, the RAN configuration model 608 may generate a different RAN resource configuration 612A-N based on the change in CSI information 602 or change in network conditions. Accordingly, the RAN may be dynamically re-provisioned to meet SLAs while minimizing compute usage.

Alternatively, or in addition, based on minimizing the compute power, conforming to the SLA requirements, and meeting 5G frame processing deadlines set by 3GPP standards for HARQ retransmissions, both compute power required and SLA requirements may be represented in terms of RAN resources and wireless channel information. Accordingly, the RAN configuration model 608 may output or otherwise determine an optimal RAN resource configuration 612A that minimizes compute power and satisfies SLA constraints. That is, the RAN configuration model 608 may receive SLA requirements and the history of wireless channel information to predict wireless channel information and estimate the RAN resources and compute required.

Each RAN resource configuration 612A-N may include information identifying a slice 624 together with a mapping from the logical radio resources to physical radio resources. In examples, the RAN resource configuration includes resource blocks, modulation, time, and MIMO layers. The RAN framework described with respect to FIGS. 1-6 differs from a one-sized fits all approach which treats all end-devices the same (similar to WiFi 802.11n) and static network slicing (where the bandwidth is statically partitioned among different slices).

In examples, the machine learning model may be trained based on training data similar to the SLA parameters and/or requirements 604 and CSI information 602. In some examples, a predicted amount of compute resources may be associated with a resource configuration meeting SLA parameters and/or requirements; such predicted compute amount may be generated from a pipeline 632. In examples, the pipeline 632 may incorporate stages including but not limited to an FFT stage 634, CSI stage 636, zeroforcing stage 638, demodulation stage 640, and/or decoding stage 644.

As another example, to represent compute power as a function of RAN resource configuration, one or more empirical models that represent computer power required as a function of RAN resource configuration may be utilized. The empirical models are directed to evaluating how changing individual RAN configuration parameters impacts compute resources required for each of the stages in the physical layer software processing pipeline 632, such as but not limited to the an FFT stage 634, CSI estimation stage 636, zeroforcing stage 638, demodulation stage 640, and decoding stage 644. For each individual parameter, the empirical models may be combined resulting in an empirical model that predicts compute required for a particular RAN configuration. With such a model, CPUs can be reliably provisioned to meet a frame processing target.

Figure 7:
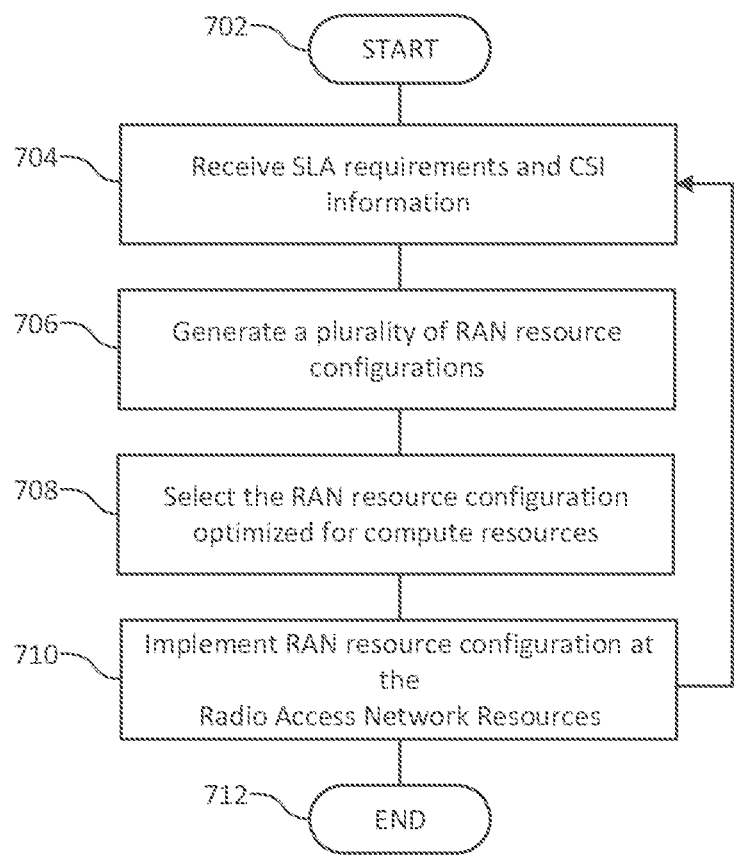
FIG. 7 illustrates an overview of an example method for allocating RAN resources according to the machine learning model techniques described herein.

FIG. 7 illustrates an overview of an example method 700 for allocating RAN resources according to the machine learning model techniques described herein. A general order of the operations for the method 700 is shown in FIG. 7. Generally, the method 700 begins with start operation 702 and ends with end operation 712. The method 700 may include more or fewer steps or may arrange the order of the steps differently than those shown in FIG. 7. The method 700 can be executed as a set of computer-executable instructions executed by a computer system and encoded or stored on a computer readable medium. Further, the method 700 can be performed by gates or circuits associated with a processor, an ASIC, an FPGA, a SOC or other hardware device. Hereinafter, the method 700 shall be explained with reference to the systems, components, devices, modules, software, data structures, data characteristic representations, signaling diagrams, methods, etc., described in conjunction with FIGS. 1-6 and 8-9B. For example, aspects of method 700 may be performed by an NSC (e.g., NSC 402 in FIG. 4, as may be implemented by a RIC (e.g., RIC 136 or RIC 152 in FIG. 1).

Following start operation 702, the method 700 obtains SLA requirements and/or parameters at operation 704. In some examples, the SLA parameters and/or requirements may not change from one frame to another; however, the CSI information or other network condition may change.

At operation 706, a plurality of RAN resource configurations may be generated based on the SLA and/or CSI information obtained at operation 704. For example, a RAN configuration model may heuristically determine RAN resource configurations, such as RAN resource configurations 612A-N based on the CSI and the parameters or requirements provided to the RAN configuration model. In other examples, a machine learning model trained on data including parameters and requirements together with respective RAN resource configurations and compute usage may generate or otherwise output a RAN resource configuration. In examples, the RAN resource configuration output from the machine learning model may be an optimal resource configuration when optimized for compute power usage. That is, multiple RAN resource configurations may satisfy the SLA parameters or requirements; however, the RAN configuration model may output or otherwise determine an optimal resource configuration based on an amount of compute power required or otherwise predicted to be used with the CSI information and a selected RAN resource configuration.

Flow progresses to operation 708, where an optimal RAN resource configuration is selected. As described above, the RAN resource configuration may utilize an optimal amount of compute resources and may be generated based on a set of service-level guarantees associated with one or more slices of the RAN. In some examples, a plurality of RAN resource configurations may be generated at 706 and an optimal RAN resource configuration is selected at 708. In other examples, a single RAN resource configuration is provided at 706 and selected at 708.

At operation 710, the selected RAN resource configuration is implemented in the RAN. For example, operation 710 may comprise communicating with one or more RAN resources (e.g., as described above with respect to FIG. 1 and/or RAN components 404 in FIG. 4) to configure the resources according to the RAN resource allocation.

An arrow is illustrated from operation 710 to operation 704 to indicate that flow may loop between operations 704-710, thereby dynamically configuring RAN resources according to the optimal RAN resource configuration techniques described herein. In examples, method 700 is performed on a frame-by-frame basis, where a RAN resource configuration is generated and implemented for each frame of the RAN. As another examples, method 700 may be performed in batches (e.g., such that operation 710 comprises providing an indication of a set of RAN resource configurations for multiple frames) or may be performed in response to one or more events, among other examples. Method 700 may eventually terminate at operation 712.

Figure 8:
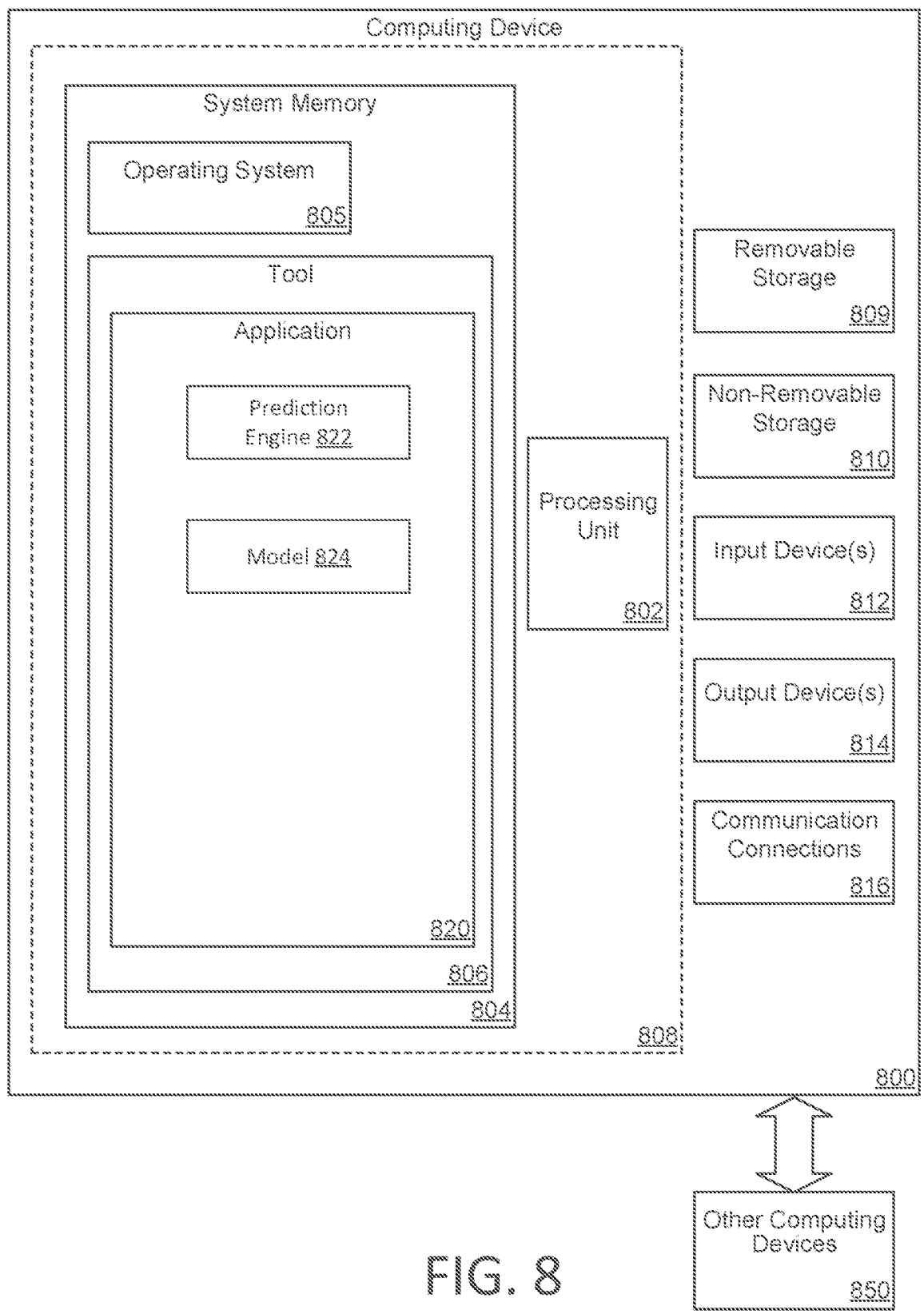
FIG. 8 is a block diagram illustrating example physical components of a computing device with which aspects of the disclosure may be practiced.

FIG. 8 is a block diagram illustrating physical components (e.g., hardware) of a computing device 800 with which aspects of the disclosure may be practiced. The computing device components described below may be suitable for the computing devices described above. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 and one or more program tools 806 suitable for performing the various aspects disclosed herein such. The operating system 805, for example, may be suitable for controlling the operation of the computing device 800. Furthermore, aspects of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program tools and data files may be stored in the system memory 804. While executing on the at least one processing unit 802, the program tools 806 (e.g., an application 820) may perform processes including, but not limited to, the aspects, as described herein. The application 820 includes a prediction engine 822 and a model 824, aspects of which are described in more detail with regard to at least FIGS. 4 and 6. Other program tools that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units, and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 800 may also have one or more input device(s) 812, such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 850. Examples of the communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program tools. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program tools, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9A:
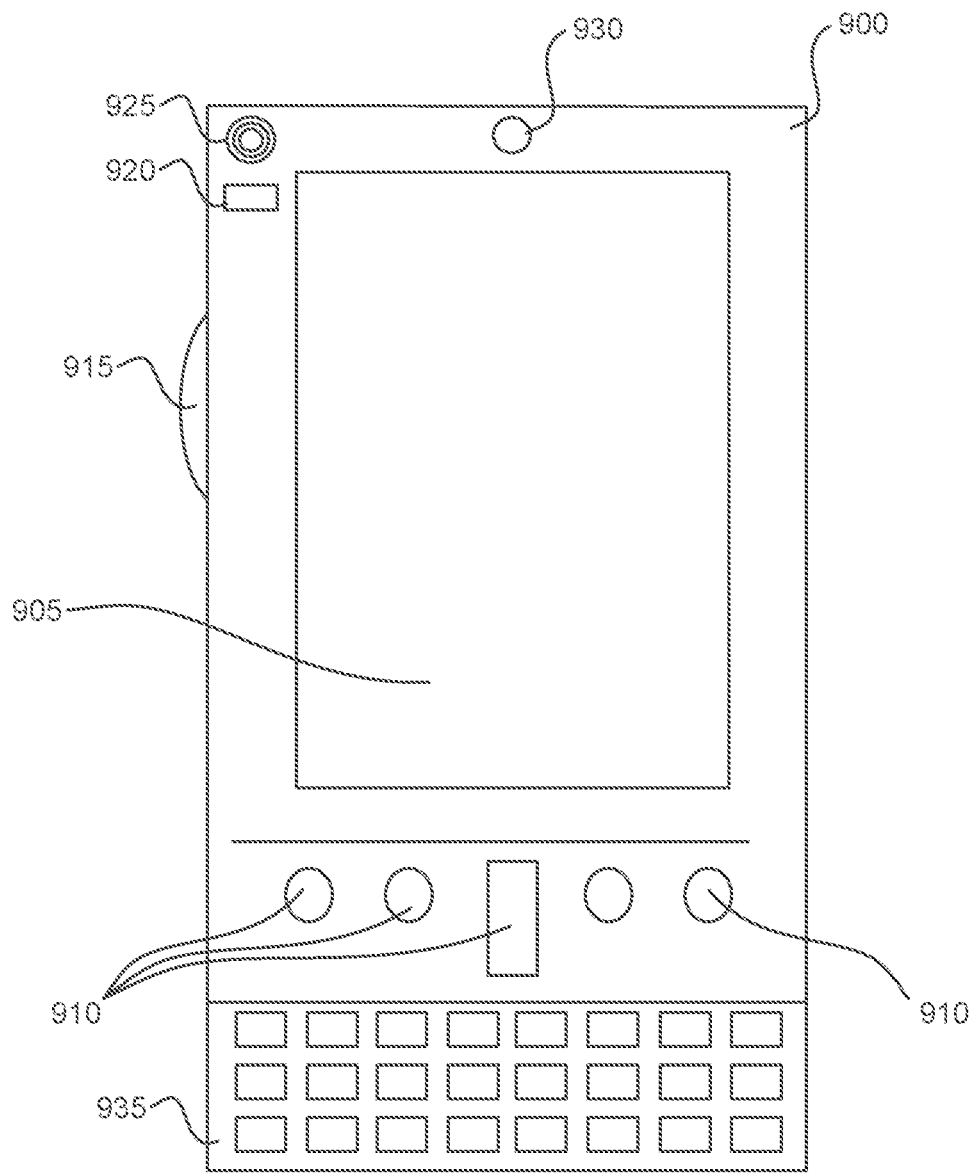
FIG. 9A is a simplified diagram of a mobile computing device with which aspects of the present disclosure may be practiced.
Figure 9B:
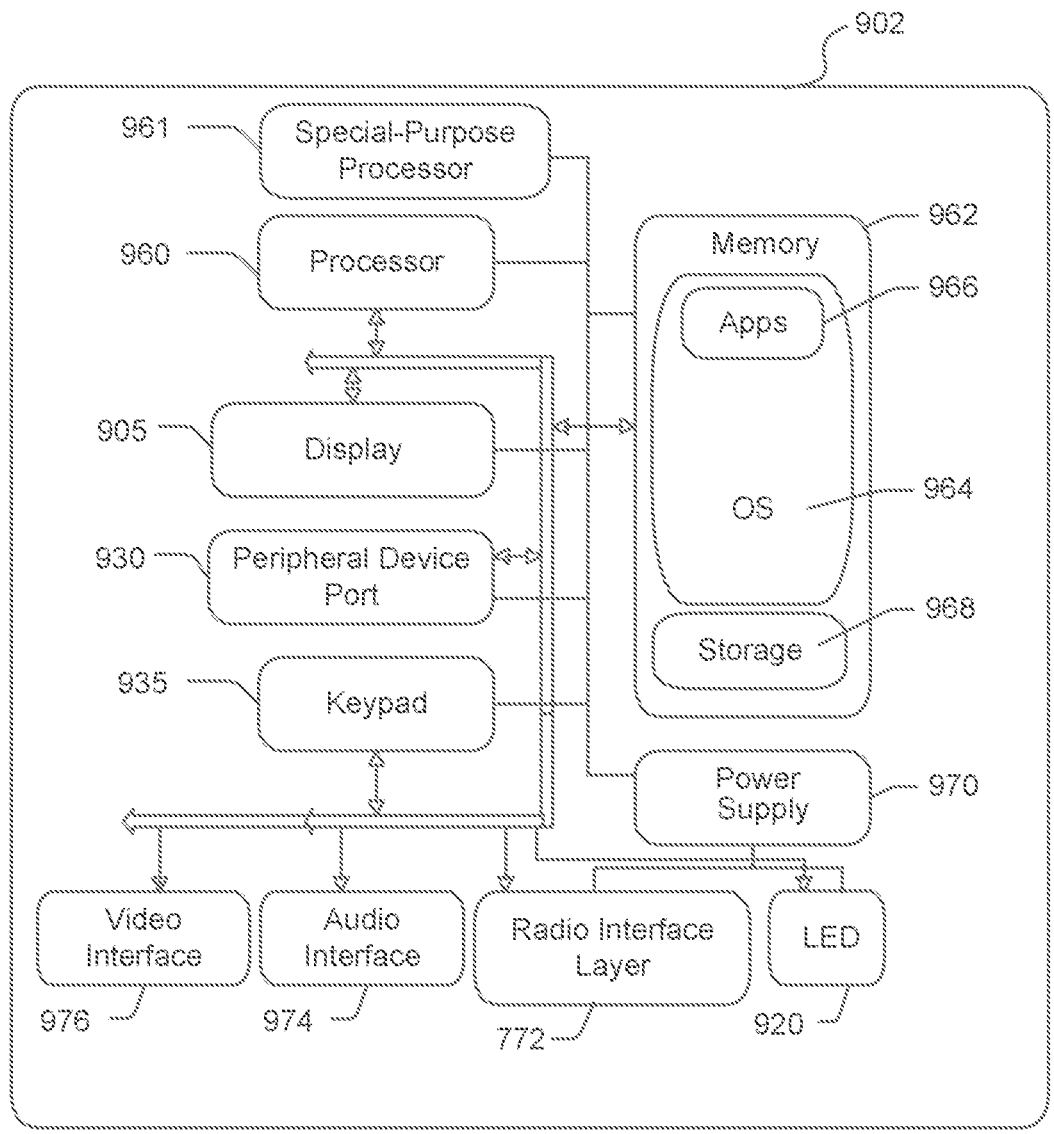
FIG. 9B is another simplified block diagram of a mobile computing device with which aspects of the present disclosure may be practiced.

FIGS. 9A and 9B illustrate a computing device or mobile computing device 900, for example, a mobile telephone, a smart phone, wearable computer (such as a smart watch), a tablet computer, a laptop computer, and the like, with which aspects of the disclosure may be practiced. In some aspects, the client utilized by a user (e.g., as an operator of servers in the far-edge data center in FIG. 1) may be a mobile computing device. With reference to FIG. 7A, one aspect of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. The display 905 of the mobile computing device 900 may also function as an input device (e.g., a touch screen display). If included as an optional input element, a side input element 915 allows further user input. The side input element 915 may be a rotary switch, a button, or any other type of manual input element. In alternative aspects, mobile computing device 900 may incorporate more or less input elements. For example, the display 905 may not be a touch screen in some aspects. In yet another alternative aspect, the mobile computing device 900 is a portable phone system, such as a cellular phone. The mobile computing device 900 may also include an optional keypad 935. Optional keypad 935 may be a physical keypad or a "soft" keypad generated on the touch screen display. In various aspects, the output elements include the display 905 for showing a graphical user interface (GUI), a visual indicator 920 (e.g., a light emitting diode), and/or an audio transducer 925 (e.g., a speaker). In some aspects, the mobile computing device 900 incorporates a vibration transducer for providing the user with tactile feedback. In yet another aspect, the mobile computing device 900 incorporates input and/or output ports, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one aspect of computing device, a server (e.g., the RAN servers 116 and the servers 134, and other servers as shown in FIG. 1), a mobile computing device, etc. That is, the mobile computing device 900 can incorporate a system 902 (e.g., a system architecture) to implement some aspects. The system 902 can implemented as a "smart phone" capable of running one or more applications (e.g., browser, e-mail, calendaring, contact managers, messaging clients, games, and media clients/players). In some aspects, the system 902 is integrated as a computing device, such as an integrated digital assistant (PDA) and wireless phone.

One or more application programs 966 may be loaded into the memory 962 and run on or in association with the operating system 964. Examples of the application programs include phone dialer programs, e-mail programs, information management (PIM) programs, word processing programs, spreadsheet programs, Internet browser programs, messaging programs, and so forth. The system 902 also includes a non-volatile storage area 968 within the memory 962. The non-volatile storage area 968 may be used to store persistent information that should not be lost if the system 902 is powered down. The application programs 966 may use and store information in the non-volatile storage area 968, such as e-mail or other messages used by an e-mail application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900 described herein.

The system 902 has a power supply 970, which may be implemented as one or more batteries. The power supply 970 might further include an external power source, such as an AC adapter or a powered docking cradle that supplements or recharges the batteries.

The system 902 may also include a radio interface layer 972 that performs the function of transmitting and receiving radio frequency communications. The radio interface layer 972 facilitates wireless connectivity between the system 902 and the "outside world," via a communications carrier or service provider. Transmissions to and from the radio interface layer 972 are conducted under control of the operating system 964. In other words, communications received by the radio interface layer 972 may be disseminated to the application programs 966 via the operating system 964, and vice versa.

The visual indicator 920 (e.g., LED) may be used to provide visual notifications, and/or an audio interface 974 may be used for producing audible notifications via the audio transducer 925. In the illustrated configuration, the visual indicator 920 is a light emitting diode (LED) and the audio transducer 925 is a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. In accordance with aspects of the present disclosure, the microphone may also serve as an audio sensor to facilitate control of notifications, as will be described below. The system 902 may further include a video interface 976 that enables an operation of an on-board camera 930 to record still images, video stream, and the like.

A mobile computing device 900 implementing the system 902 may have additional features or functionality. For example, the mobile computing device 900 may also include additional data storage devices (removable and/or non-removable) such as, magnetic disks, optical disks, or tape. Such additional storage is illustrated in FIG. 9B by the non-volatile storage area 968.

Data/information generated or captured by the mobile computing device 900 and stored via the system 902 may be stored locally on the mobile computing device 900, as described above, or the data may be stored on any number of storage media that may be accessed by the device via the radio interface layer 972 or via a wired connection between the mobile computing device 900 and a separate computing device associated with the mobile computing device 900, for example, a server computer in a distributed computing network, such as the Internet. As should be appreciated such data/information may be accessed via the mobile computing device 900 via the radio interface layer 972 or via a distributed computing network. Similarly, such data/information may be readily transferred between computing devices for storage and use according to well-known data/ information transfer and storage means, including electronic mail and collaborative data/information sharing systems.

The description and illustration of one or more aspects provided in this application are not intended to limit or restrict the scope of the disclosure as claimed in any way. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The present disclosure relates to systems and methods for determining a RAN resource configuration according to at least the examples provided in the sections below:

(A1) In one aspect, some examples include a method for allocating resources of a radio access network (RAN). The method may include: receiving communication requirements from a plurality of service level agreements (SLAs); retrieving a model that predicts an amount of compute resources needed to implement resource allocation configurations of a radio access network (RAN), the model being trained on training data mapping changes in RAN resource configurations to compute resources needed at one or more stages in a physical layer software processing pipeline; generating, using the retrieved model, a resource allocation configuration for a set of resources of the RAN based on the received communication requirements; and implementing the resource allocation by forming a first RAN slice comprising a first set of logical resources and a second RAN slice comprising a second set of logical resources.

(A2) In some examples of A1, the set of resources of the RAN comprises a local scheduler of the first RAN slice to allocate the first set of logical resources among a set of devices associated with the first RAN slice.

(A3) In some examples of A1-A2, the generated resource allocation configuration for the set of resources of the RAN based on the received communication requirements is a resource allocation configuration having a lowest amount of compute required.

(A4) In some examples of A1-A3, generating the resource allocation configuration for the set of resources of a RAN includes: receiving communication requirements for a plurality of different SLAs; generating, using the retrieved model, a second resource allocation configuration for the set of resources of the RAN based on the received communication requirements for the plurality of different SLAs; and implementing the second resource allocation by forming a different first RAN slice comprising a third set of logical resources and a different second RAN slice comprising a fourth set of logical resources.

(A5) In some examples of A1-A4, the resource allocation is for a first frame of the RAN and the second resource allocation is for a frame after the first frame.

(A6) In some examples of A1-A5, the second resource allocation comprises an indication of at least one of: a resource block allocation; a time slot allocation; a numerology allocation; or a multiple-input and multiple-output (MIMO) layer allocation.

(A7) In some examples of A1-A6, the method further includes: receiving an indication that network conditions of the RAN have changed; and generating a second resource allocation configuration for the set of resources of the RAN based on the received communication requirements.

In yet another aspect, some examples include a system including one or more processors and memory coupled to the one or more processors, the memory storing one or more instructions which when executed by the one or more processors, causes the one or more processors to perform any of the methods described herein (e.g., A1-A7 described above).

In yet another aspect, some examples include a computer-readable storage medium storing one or more programs for execution by one or more processors of a device, the one or more programs including instructions for performing any of the methods described herein (e.g., A1-A7 described above).

(B1) In one aspect, some examples include a method for allocating resources of a radio access network (RAN) to form a first RAN slice and a second RAN slice. The method may include receiving communication requirements from a plurality of service level agreements (SLAs); retrieving a model that predicts an amount of compute resources needed to implement resource allocation configurations of a radio access network (RAN), the model being based on data mapping changes in RAN resource configurations to compute resources needed at one or more stages in a physical layer software processing pipeline; receiving channel state information associated with a device in communication with the RAN; generating, using the retrieved model, a resource allocation configuration for a set of resources of the RAN based on the received communication requirements and the channel state information; and implementing the resource allocation, thereby forming the first RAN slice comprising a first set of logical resources and the second RAN slice comprising a second set of logical resources.

(B2) In some examples of B1, the generated resource allocation configuration for the set of resources of the RAN based on the received communication requirements and the channel state information is a resource allocation configuration having a lowest amount of compute required.

(B3) In some examples of B1-B2, generating the resource allocation configuration for the set of resources of a RAN includes receiving communication requirements for a plurality of different SLAs; generating, using the model, a second resource allocation configuration for the set of resources of the RAN based on the received communication requirements for the plurality of different SLAs; and implementing the second resource allocation, thereby forming a different first RAN slice comprising a third set of logical resources and a different second RAN slice comprising a fourth set of logical resources.

(B4) In some examples of B1-B3, the resource allocation comprises an indication of at least one of: a resource block allocation; a time slot allocation; a numerology allocation; or a multiple-input and multiple-output (MIMO) layer allocation.

(B5) In some examples of B1-B4, the resource allocation is for a first frame of the RAN and the second resource allocation is for a frame after the first frame.

(B6) In some examples of B1-B5, the first RAN slice is a low-latency network and the second RAN slice is a mobile broadband network.

In yet another aspect, some examples include a system including one or more processors and memory coupled to the one or more processors, the memory storing one or more instructions which when executed by the one or more processors, causes the one or more processors to perform any of the methods described herein (e.g., B1-B6 described above).

In yet another aspect, some examples include a computer-readable storage medium storing one or more programs for execution by one or more processors of a device, the one or more programs including instructions for performing any of the methods described herein (e.g., B1-B6 described above).

Any of the one or more above aspects in combination with any other of the one or more aspect. Any of the one or more aspects as described herein.

What is claimed is:

1. A system comprising:
   at least one processor; and
   memory storing instructions that, when executed by the at least one processor, causes the system to perform a set of operations, the set of operations comprising:
      receiving communication requirements from a plurality of service level agreements (SLAs);
      retrieving a model that predicts an amount of compute resources needed to implement resource allocation configurations of a radio access network (RAN), the model being trained on training data mapping changes in RAN resource configurations to compute resources needed at one or more stages in a physical layer software processing pipeline;
      generating, using the retrieved model, a resource allocation configuration for a set of resources of the RAN based on the received communication requirements; and
      implementing the resource allocation configuration by forming a first RAN slice comprising a first set of logical resources and a second RAN slice comprising a second set of logical resources.

2. The system of claim 1, wherein the set of resources of the RAN comprises a local scheduler of the first RAN slice to allocate the first set of logical resources among a set of devices associated with the first RAN slice.

3. The system of claim 1, wherein the generated resource allocation configuration for the set of resources of the RAN based on the received communication requirements is a resource allocation configuration having a lowest amount of compute required.

4. The system of claim 1, wherein generating the resource allocation configuration for the set of resources of a RAN includes:
   receiving communication requirements for a plurality of different SLAs;
   generating, using the retrieved model, a second resource allocation configuration for the set of resources of the RAN based on the received communication requirements for the plurality of different SLAs; and
   implementing the second resource allocation configuration by forming a different first RAN slice comprising a third set of logical resources and a different second RAN slice comprising a fourth set of logical resources.

5. The system of claim 4, wherein the resource allocation configuration is for a first frame of the RAN and the second resource allocation configuration is for a frame after the first frame.

6. The system of claim 5, wherein the first RAN slice is a low-latency network and the second RAN slice is a mobile broadband network.

7. The system of claim 1, wherein the resource allocation configuration comprises an indication of at least one of:
   a resource block allocation;
   a time slot allocation;
   a numerology allocation; or
   a multiple-input and multiple-output (MIMO) layer allocation.

8. A method for allocating resources of a radio access network (RAN), the method comprising:
   receiving communication requirements from a plurality of service level agreements (SLAs);
   retrieving a model that predicts an amount of compute resources needed to implement resource allocation configurations of a radio access network (RAN), the model being trained on training data mapping changes in RAN resource configurations to compute resources needed at one or more stages in a physical layer software processing pipeline;
   generating, using the retrieved model, a resource allocation configuration for a set of resources of the RAN based on the received communication requirements; and
   implementing the resource allocation configuration by forming a first RAN slice comprising a first set of logical resources and a second RAN slice comprising a second set of logical resources.

9. The method of claim 8, wherein the set of resources of the RAN comprises a local scheduler of the first RAN slice to allocate the first set of logical resources among a set of devices associated with the first RAN slice.

10. The method of claim 8, wherein the generated resource allocation configuration for the set of resources of the RAN based on the received communication requirements is a resource allocation configuration having a lowest amount of compute required.

11. The method of claim 8, wherein generating the resource allocation configuration for the set of resources of a RAN includes:
    receiving communication requirements for a plurality of different SLAs;
    generating, using the retrieved model, a second resource allocation configuration for the set of resources of the RAN based on the received communication requirements for the plurality of different SLAs; and
    implementing the second resource allocation configuration by forming a different first RAN slice comprising a third set of logical resources and a different second RAN slice comprising a fourth set of logical resources.

12. The method of claim 11, wherein the resource allocation configuration is for a first frame of the RAN and the second resource allocation configuration is for a frame after the first frame.

13. The method of claim 11, wherein the second resource allocation configuration comprises an indication of at least one of:
    a resource block allocation;
    a time slot allocation;
    a numerology allocation; or
    a multiple-input and multiple-output (MIMO) layer allocation.

14. The method of claim 8, further comprising:
    receiving an indication that network conditions of the RAN have changed; and
    generating a second resource allocation configuration for the set of resources of the RAN based on the received communication requirements.

15. A method for allocating resources of a radio access network (RAN) to form a first RAN slice and a second RAN slice, the method comprising:
    receiving communication requirements from a plurality of service level agreements (SLAs);

retrieving a model that predicts an amount of compute resources needed to implement resource allocation configurations of a radio access network (RAN), the model being based on data mapping changes in RAN resource configurations to compute resources needed at one or more stages in a physical layer software processing pipeline;

receiving channel state information associated with a device in communication with the RAN;

generating, using the retrieved model, a resource allocation configuration for a set of resources of the RAN based on the received communication requirements and the channel state information; and implementing the resource allocation configuration, thereby forming the first RAN slice comprising a first set of logical resources and the second RAN slice comprising a second set of logical resources.

16. The method of claim 15, wherein the generated resource allocation configuration for the set of resources of the RAN based on the received communication requirements and the channel state information is a resource allocation configuration having a lowest amount of compute required.

17. The method claim 15, wherein generating the resource allocation configuration for the set of resources of a RAN includes:

receiving communication requirements for a plurality of different SLAs;

generating, using the model, a second resource allocation configuration for the set of resources of the RAN based on the received communication requirements for the plurality of different SLAs; and implementing the second resource allocation configuration, thereby forming a different first RAN slice comprising a third set of logical resources and a different second RAN slice comprising a fourth set of logical resources.

18. The method of claim 17, wherein the resource allocation configuration and the second resource allocation configuration each comprise an indication of at least one of:
a resource block allocation;
a time slot allocation;
a numerology allocation; or
a multiple-input and multiple-output (MIMO) layer allocation.

19. The method of claim 17, wherein the resource allocation configuration is for a first frame of the RAN and the second resource allocation configuration is for a frame after the first frame.

20. The method of claim 15, wherein the first RAN slice is a low-latency network and the second RAN slice is a mobile broadband network.

* * * * *